US012719635B2

(12) United States Patent
Mu

(10) Patent No.: US 12,719,635 B2
(45) Date of Patent: Aug. 25, 2026

(54) PHYSICAL DOWNLINK CONTROL CHANNEL TRANSMISSION METHOD AND APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 574 days.

(21) Appl. No.: 17/919,527

(22) PCT Filed: Apr. 20, 2020

(86) PCT No.: PCT/CN2020/085718
§ 371 (c)(1),
(2) Date: Oct. 17, 2022

(87) PCT Pub. No.: WO2021/212286
PCT Pub. Date: Oct. 28, 2021

(65) Prior Publication Data

US 2023/0179373 A1 Jun. 8, 2023

(51) Int. Cl.
*H04L 5/00* (2006.01)
*H04W 72/23* (2023.01)

(52) U.S. Cl.
CPC ........... *H04L 5/0053* (2013.01); *H04W 72/23* (2023.01); *H04L 5/0007* (2013.01)

(58) Field of Classification Search
CPC ... H04L 5/0053; H04L 5/0007; H04L 5/0058; H04L 5/1469; H04W 72/23
(Continued)

(56) References Cited

U.S. PATENT DOCUMENTS

2018/0227156 A1* 8/2018 Papasakellariou ........................... H04L 27/2613
2018/0279135 A1* 9/2018 Hwang ................. H04L 1/1861
(Continued)

FOREIGN PATENT DOCUMENTS

CN 108809588 A 11/2018
CN 109391430 A 2/2019
(Continued)

OTHER PUBLICATIONS

Panasonic, "The relation among REG, CCE, and CORESET", R1-1711327, Jun. 27-30, 2017. (From Applicant's IDS) (Year: 2017).*

(Continued)

*Primary Examiner* — Mang Hang Yeung
(74) *Attorney, Agent, or Firm* — Arch & Lake LLP; Hao Tan; Shen Wang

(57) ABSTRACT

A method for transmitting a physical downlink control channel includes: a base station determining a CORESET configured for a terminal; then numbering resource element groups (REGs) in the CORESET according to a numbering rule corresponding to the CORESET; next, combining the REGs into an REG packet according to an REG mapping rule corresponding to the CORESET, and performing resource mapping on a physical downlink control channel corresponding to the terminal to obtain a control channel element (CCE); and finally, the base station transmitting the physical downlink control channel to the terminal.

14 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0097756 A1 | 3/2019 | Chatterjee et al. | |
| 2019/0140776 A1* | 5/2019 | Seo | H04B 7/0456 |
| 2020/0021419 A1 | 1/2020 | Taherzadeh Boroujeni et al. | |
| 2020/0178236 A1 | 6/2020 | Gong et al. | |

FOREIGN PATENT DOCUMENTS

| | | | |
|---|---|---|---|
| CN | 109392011 | A | 2/2019 |
| CN | 109661846 | A | 4/2019 |
| CN | 109716693 | A | 5/2019 |
| CN | 109964444 | A | 7/2019 |
| CN | 110235407 | A | 9/2019 |
| CN | 110612690 | A | 12/2019 |
| CN | 110784927 | A | 2/2020 |
| CN | 110798866 | A | 2/2020 |
| CN | 111034292 | A | 4/2020 |
| WO | 2011066793 | A1 | 6/2011 |
| WO | 2018202091 | A1 | 11/2018 |
| WO | 2019024052 | A1 | 2/2019 |
| WO | 2019028770 | A1 | 2/2019 |
| WO | 2019137401 | A1 | 7/2019 |

OTHER PUBLICATIONS

Intel Corporation, "Remaining details of NR-PDCCH structure" TSG-RAN WG1 91, R1-1720081, Reno, USA, Nov. 27-Dec. 1, 2017, (6p).
International Search Report issued in Application No. PCT/CN2020/085718, dated Jan. 18, 2021,with English translation,(4p).
Notice of Allowance issued to Chinese Application No. 2020800007752 dated Dec. 26, 2024 with English translation, (11p).
Panasonic, "The relation among REG, CCE, and CORESET", 3GPP TSG RAN WG1 NR Ad-Hoc#2, R1-1711327, Qingdao, PR China, Jun. 27-30, 2017, (4p).
LG Electronics, "Discussion on CORESET configuration", 3GPP TSG RAN WG1 NR Ad-Hoc#2, R1-1710305, Qingdao, PR China, Jun. 27-30, 2017, (7p).

* cited by examiner 1010
rule acquiring module
1020
channel receiving module

PHYSICAL DOWNLINK CONTROL CHANNEL TRANSMISSION METHOD AND APPARATUS, AND STORAGE MEDIUM

CROSS-REFERENCE TO RELATED APPLICATION

The application is a U.S. National Stage of International Application No. PCT/CN2020/085718 filed on Apr. 20, 2020, the entire content of which is incorporated herein by reference for all purposes.

TECHNICAL FIELD

The present disclosure relates to the field of wireless communication technology, and in particular to a method and an apparatus for transmitting physical downlink control channel, and a storage medium.

BACKGROUND

In wireless communication technology, when a terminal needs to transmit a physical downlink control channel (PDCCH), the terminal needs to obtain resource allocation from a base station. In order to obtain the corresponding resource allocation, the base station may configure a corresponding terminal with a control resource set (CORESET) by occupying 1 to 3 orthogonal frequency division multiplexing (OFDM) symbols in the time domain and several physical resource blocks (PRBs) in the frequency domain.

SUMMARY

The present disclosure is directed to a method and an apparatus for transmitting physical downlink control channel, and a storage medium. The technical solution is as follows.

According to a first aspect of the disclosure, a PDCCH transmission method is provided. The method is performed by a base station and includes:

- determining a control resource set (CORESET) configured for a terminal;
- numbering each of resource element groups (REGs) in the CORESET according to a numbering rule, where the numbering rule is used for determining an order for numbering the each of REGs in the CORESET;
- combining at least one REG into an REG packet according to an REG mapping rule, where the REG mapping rule is used for determining a mapping between the REGs in the CORESET and the REG packet;
- combining at least one REG packet into a control channel element (CCE) according to an REG packet mapping rule, where the REG packet mapping rule is used for determining a mapping between the REG packet and the CCE; and
- transmitting a PDCCH formed by at least one CCE to the terminal.

According a second aspect of the disclosure, a PDCCH transmission method is provided. The method is performed by a terminal and includes:

- acquiring at least one of an REG mapping rule and a numbering rule of a CORESET used by a base station to send a PDCCH; and
- receiving the PDCCH sent by the base station according to the at least one of the REG mapping rule and the numbering rule.

According to a third aspect of the disclosure, a PDCCH transmission apparatus is provided. The apparatus is applied in a base station and includes:

- a resource set determination module, configured to determine a control resource set (CORESET) configured for a terminal;
- a numbering module, configured to number each of resource element groups (REGs) in the CORESET according to a numbering rule, where the numbering rule is used for determining an order for numbering the each of REGs in the CORESET;
- an REG packet combination module, configured to combine at least one REG into an REG packet according to an REG mapping rule, where the REG mapping rule is used for determining a mapping between the REGs in the CORESET and the REG packet;
- a control channel element (CCE) combination module, configured to combine at least one REG packet into a CCE according to an REG packet mapping rule, where the REG packet mapping rule is used for determining a mapping between the REG packet and the CCE; and
- a channel transmission module, configured to transmit a PDCCH formed by at least one CCE to the terminal.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
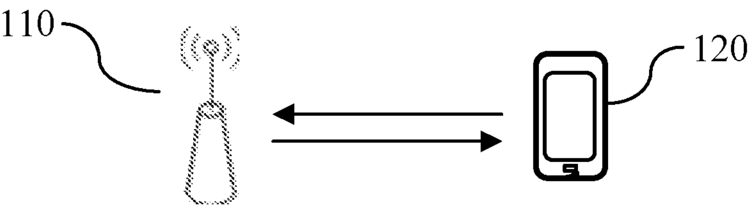
FIG. 1 is a schematic diagram of a PDCCH transmission system according to some examples of the disclosure.

Exemplary embodiments will be described in detail here, and examples thereof are shown in the accompanying drawings. When the following description refers to the accompanying drawings, unless otherwise indicated, the same numbers in different drawings represent the same or similar elements. The implementation manners described in the following exemplary embodiments do not represent all implementation manners consistent with the present disclosure. On the contrary, they are merely examples of devices and methods consistent with some aspects of the present disclosure as detailed in the appended claims.

It should be understood that the "several" mentioned in this text refers to one or more, and the "plurality" refers to two or more. The "and/or" describes the association relationship of the associated objects, indicating that there may be three types of relationships. For example, A and/or B may refer to that A exists alone, both A and B exist, and B exists alone. The character "/" generally indicates that the associated objects before and after it are in an "or" relationship.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

To facilitate understanding, the terms involved in the examples of the disclosure are described below.

1) NR-Lite (Simplified New Radio System)

In the LTE 4G system, in order to support the Internet of things (IOT) service, two technologies are proposed: machine type communication (MTC) and narrow band IOT (NB-IoT). These two technologies are mainly aimed at scenarios characterized in low speed and high latency. However, no matter how NB-IoT and MTC evolve, they both are low-power wide area IoT networks, and their basic capabilities, including low power consumption, low cost, wide coverage, and large connections, remain unchanged, so they are mainly used for "low-level IoT application scenarios" with low data transmission rate and high latency, such as smart parking, smart meter reading, smart street light, and the like. On the other hand, with the continuous development of IoT services, such as the popularity of video surveillance, smart home, wearable devices, and industrial sensor monitoring, these services usually require speed of tens to hundreds of megabytes per second, and also have relatively high requirements for delay. Therefore, MTC and NB-IoT technologies in LTE are difficult to meet the requirements. Based on this situation, it is proposed to design a new IoT technology in the 5G new radio to cover requirements of these mid-end IoT devices.

2) PDCCH (Physical Downlink Control Channel)

In the air interface protocol, physical channels, transmission channels and logical channels are defined. The logical channel describes the type of information, that is, defines what information is transmitted. The transmission channel describes the transmission manner of information, that is, defines how the information is transmitted. The physical channel is used by the physical layer for the transmission of specific signals.

In some examples, the physical channels include PDCCH, physical uplink shared channel (PUSCH), physical downlink shared channel (PDSCH), and physical uplink control channel (PUCCH). Downlink control information (DCI) can be transmitted through the PDCCH.

Referring to FIG. 1, it shows a schematic diagram of a PDCCH transmission system according to some examples of the disclosure. As shown in FIG. 1, the PDCCH transmission system may include a base station 110 and a terminal 120.

In some examples, the terminal 120 may be a wireless communication device that supports multiple wireless access technologies for data transmission. The terminal 120 may communicate with one or more core networks via a radio access network (RAN). The terminal 120 may be an IoT terminal, such as a sensor device, a mobile phone (or called a "cellular" phone) and a computer with an IoT terminal, which may be, for example, fixed, portable, pocket-sized, handheld, computer-built-in or vehicle-mounted. For example, it may be station (STA), subscriber unit, subscriber station, mobile station, mobile site, remote station, access point, remote terminal, access terminal, user terminal, user agent, user device, or user equipment (UE). Alternatively, the terminal 120 may also be a device of an unmanned aerial vehicle.

The base station 110 may be a network side device in a wireless communication system. In some examples, the wireless communication system may be a 5G system, also known as a new radio (NR) system. Alternatively, the wireless communication system may also be the next-generation system of the 5G system. Alternatively, it can also be an NR-lite system.

In some examples, the base station 120 may be a gNB adopting a centralized and distributed architecture in the 5G system. When the base station 120 adopts a centralized and distributed architecture, it usually includes a central unit (CU) and at least two distributed units (DU). The CU is provided with a protocol stack including a packet data convergence protocol (PDCP) layer, a radio link control (RLC) layer, and a media access control (MAC) layer. The DU is provided with a physical (PHY) layer protocol stack. Examples of the present disclosure do not limit the specific implementation manner of the base station 110.

A wireless connection can be established between the base station 110 and the terminal 120 through a wireless air interface. In different examples, the wireless air interface is a wireless air interface based on the fifth-generation mobile communication network technology (5G) standard, for example, the wireless air interface is a new air interface; or, the wireless air interface may also be a wireless air interface in accordance with a next-generation mobile communication network technology standard based on 5G.

As described in the background section, in order to obtain the corresponding resource allocation, the base station may configure a corresponding terminal with a CORESET by occupying 1 to 3 OFDM symbols in the time domain and several PRBs in the frequency domain. In the CORESET, each resource element group (REG) is numbered first in the time-domain direction and then in the frequency-domain direction. By combining multiple REGs into REG packets, a correspondence between control channel elements (CCEs), which are constituted by the REG packets, and indexes of the REG packets is calculated to obtain a resource mapping result.

However, the capacity of the existing CORESET is limited, the number of CCEs obtained as described above is limited, and a high degree of CCE aggregation cannot be provided, which may lead to repeated transmission of transmitted PDCCH, thereby causing the resource mapping with a relatively low rate and high delay.

Figure 2:
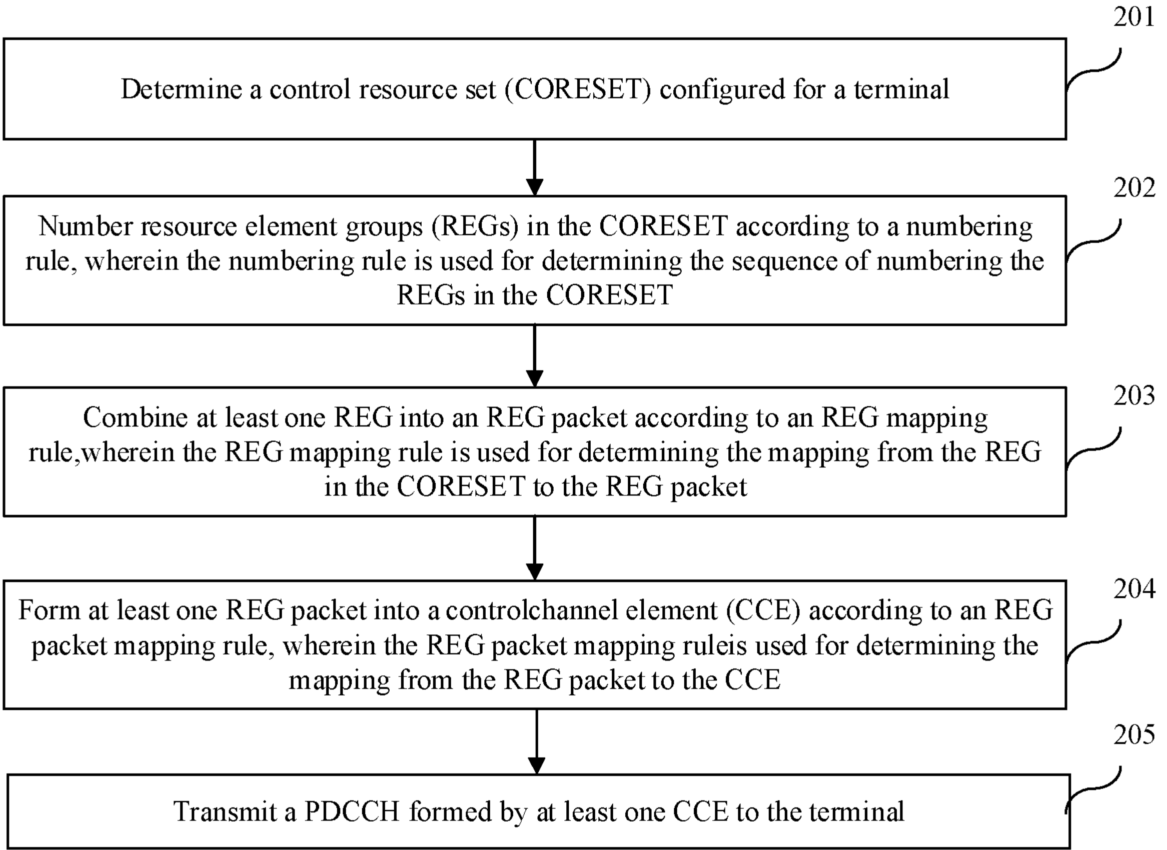
FIG. 2 is a flowchart of a PDCCH transmission method according to some examples of the disclosure.

Examples of the present disclosure provide a method for transmitting a PDCCH. Referring to FIG. 2, it shows a flowchart of the method for transmitting a PDCCH according to some examples of the disclosure. The PDCCH transmission method may be applied to the PDCCH transmission system shown in FIG. 1 and performed by the base station in FIG. 1. The method may include the following steps.

In step 201, a control resource set (CORESET) configured for a terminal is determined.

In step 202, each of resource element groups (REGs) in the CORESET is numbered according to a numbering rule, where the numbering rule is used for determining an order in which each of REGs in the CORESET is numbered.

In step 203, at least one REG is combined into an REG packet according to an REG mapping rule, where the REG mapping rule is used for determining a mapping of the REGs in the CORESET to the REG packet.

In step 204, at least one REG packet is combined into a control channel element (CCE) according to an REG packet mapping rule, where the REG packet mapping rule is used for determining a mapping of the REG packet to the CCE.

In step 205, a PDCCH formed by at least one CCE is transmitted to the terminal.

In view of above, during the transmission of PDCCH, the base station determines the CORESET configured for the terminal, numbers each of REGs in the CORESET according to the numbering rule corresponding to the CORESET, then divides the REGs into REG packets according to the REG mapping rule corresponding to the CORESET, and obtains the CCE by performing resource mapping on the PDCCH corresponding to the terminal. On the other hand, the terminal receives the REG mapping rule used by the base station for transmission. Finally, the base station transmits the PDCCH to the terminal, and the terminal can receive the PDCCH sent by the base station according to the REG mapping rule. Herein, since the resource mapping is performed based on the REG mapping rule, the capacity of CORESET can be expanded, and a higher degree of CCE aggregation can be obtained, thereby improving the efficiency of resource mapping.

Figure 3:
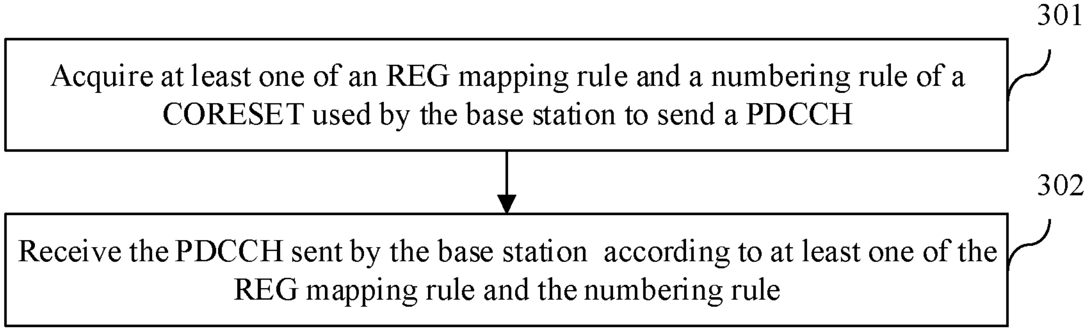
FIG. 3 is a flowchart of a PDCCH transmission method according to some examples of the disclosure.

Examples of the present disclosure provide a method for transmitting a PDCCH. Referring to FIG. 3, it shows a flowchart of the method for transmitting a PDCCH according to some examples of the disclosure. The PDCCH transmission method may be applied to the PDCCH transmission system shown in FIG. 1 and performed by the terminal in FIG. 1. The method may include the following steps.

In step 301, at least one of an REG mapping rule and a numbering rule of a CORESET used by the base station to send a PDCCH is acquired.

In step 302, the PDCCH sent by the base station is received according to at least one of the REG mapping rule and the numbering rule.

In view of above, during the transmission of PDCCH, the base station determines the CORESET configured for the terminal, numbers each of REGs in the CORESET according to the numbering rule corresponding to the CORESET, then divides the REGs into REG packets according to the REG mapping rule corresponding to the CORESET, and obtains the CCE by performing resource mapping on the PDCCH corresponding to the terminal. On the other hand, the terminal receives the REG mapping rule used by the base station for transmission. Finally, the base station transmits the PDCCH to the terminal, and the terminal can receive the PDCCH sent by the base station according to the REG mapping rule. Herein, since the resource mapping is performed based on the REG mapping rule, the capacity of CORESET can be expanded, and a higher degree of CCE aggregation can be obtained, thereby improving the efficiency of resource mapping.

Figure 4:
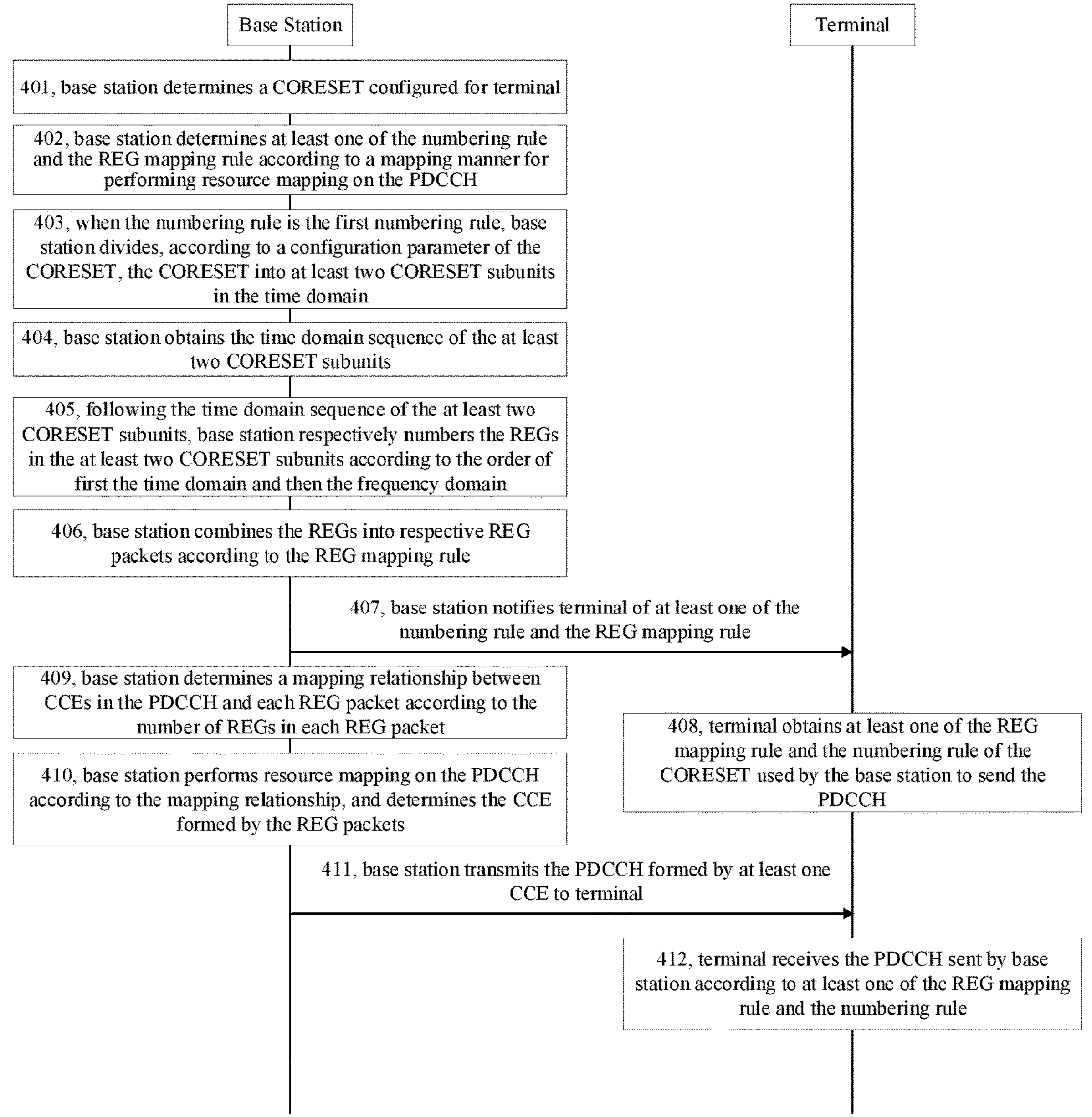
FIG. 4 is a flowchart of a PDCCH transmission method according to some examples of the disclosure.

Referring to FIG. 4, it shows a flowchart of the PDCCH transmission method according to some examples of the disclosure. The PDCCH transmission method may be applied to the PDCCH transmission system shown in FIG. 1 and performed based on an interaction between the terminal and the base station in FIG. 1. The method may include the following steps.

In step 401, the base station determines a CORESET configured for the terminal.

In some examples of the disclosure, the base station configures a corresponding CORESET to the terminal.

In some examples, in order to perform PDCCH transmission, the base station configures the CORESET for a corresponding user terminal, and the CORESET occupies N OFDM symbols in the time domain and M physical resource blocks (PRBs) in the frequency domain, where N may be a positive integer greater than 3, and M may be a positive integer greater than 1.

Figure 5:
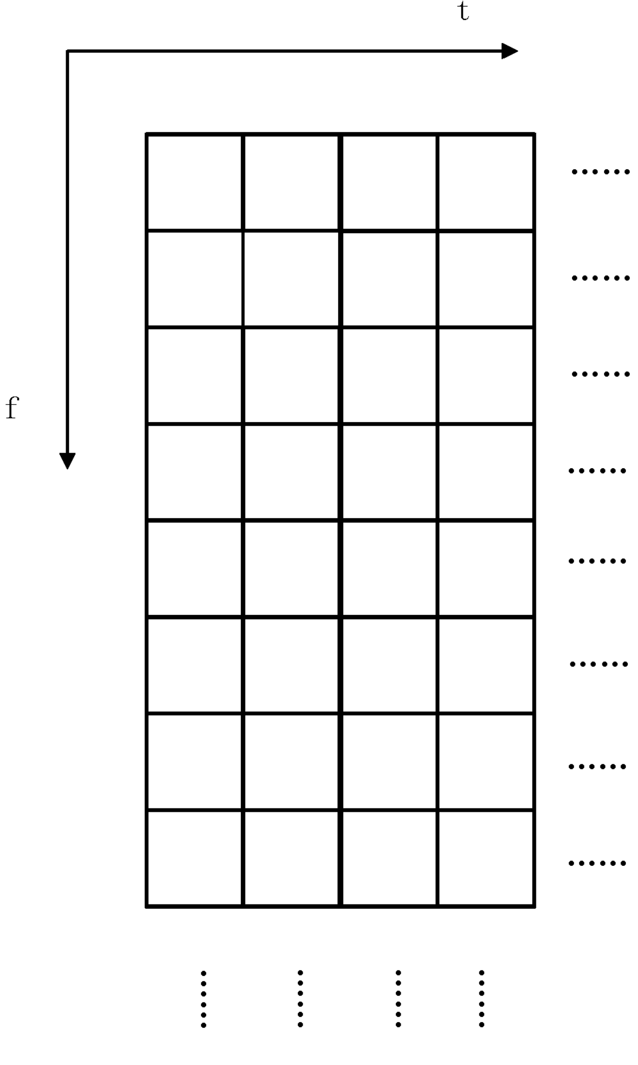
FIG. 5 is a schematic diagram of a CORESET composition related to the example shown in FIG. 4.

For example, referring to FIG. 5, it shows a schematic diagram of a CORESET composition related to some examples of the disclosure. As shown in FIG. 5, the CORESET occupies several OFDM symbols in the abscissa direction, that is, in the time domain direction, where one small grid in the time domain direction represents one OFDM symbol; and the CORESET occupies several PRBs in the ordinate direction, that is, in the frequency domain direction, where one small grid in the frequency domain direction represents one PRB.

In step 402, the base station determines at least one of the numbering rule and the REG mapping rule according to a mapping manner for performing resource mapping on the PDCCH.

In some examples of the disclosure, the base station determines at least one of the numbering rule of REG in the CORESET and the REG mapping rule according to the mapping manner of the resource mapping during PDCCH transmission.

Herein, the numbering rule may be used for indicating the order in which each REG in the CORESET is numbered, and the REG mapping rule may be used for indicating the division manner of the REG packet in the CORESET.

In some examples, the numbering rule includes a first numbering rule and a second numbering rule, in which the REGs are numbered in different orders. Similarly, the REG mapping rules may include a first REG mapping rule and a second REG mapping rule. In some examples, the two numbering rules have a unique corresponding relationship with the two REG mapping rules. In other words, when the numbering rule is determined, the REG mapping rule corresponding to the numbering rule can be determined. Similarly, when the REG mapping rule is determined, the numbering rule corresponding to the REG mapping rule can also be determined.

In some examples, the base station determines any one of the numbering rule and the REG mapping rule according to a mapping manner for performing resource mapping on the PDCCH, and obtain another rule as determined according to the corresponding relationship. Alternatively, the base station directly determines the numbering rule and the REG mapping rule.

In some examples, the mapping manner for performing resource mapping on the PDCCH includes a centralized mapping and a distributed mapping.

In some examples, when the base station determines that the mapping manner for performing resource mapping on the PDCCH is the distributed mapping, the numbering rule may be determined as the first numbering rule, and the corresponding REG mapping rule may be the first REG mapping rule. When the base station determines that the mapping manner for performing resource mapping on the PDCCH is the centralized mapping, the numbering rule may be determined as the second numbering rule, and the corresponding REG mapping rule may be the second REG mapping rule.

In step 403, when the numbering rule is the first numbering rule, the base station divides, according to a configuration parameter of the CORESET, the CORESET into at least two CORESET subunits in the time domain.

In some examples of the disclosure, when the base station determines that the numbering rule is the first numbering rule according to the mapping manner for performing resource mapping on the PDCCH, the base station divides the CORESET into at least two CORESET subunits in the time domain according to the configuration parameter of the CORESET.

In some examples, the at least two CORESET subunits are multiplexed in a time division manner.

In some examples, the configuration parameter of CORESET includes at least one of: the number of OFDM symbols occupied by the CORESET subunit in the time domain, the number of PRBs occupied by the CORESET subunit in the frequency domain, and the configured number of the CORESET subunit.

In some other examples, the configuration parameter of CORESET includes at least one of: the number of OFDM symbols occupied by the CORESET in the time domain, the number of PRBs occupied by the CORESET in the frequency domain, and the configured number of the CORESET subunit.

In some examples, based on the number of OFDM symbols occupied by the CORESET subunit in the time domain and the number of PRBs occupied by the CORESET subunit in the frequency domain given in the configuration parameters of the CORESET, the base station divides the CORESET into CORESET subunits with the configured number of CORESET subunits.

In some examples, the duration of each CORESET subunit in the CORESET is the same in the time domain, that is, the number of OFDM symbols occupied by each CORESET subunit in the time domain is the same. On the other hand, the number of PRBs occupied by each CORESET subunit in the frequency domain may be the same or different.

Figure 6:
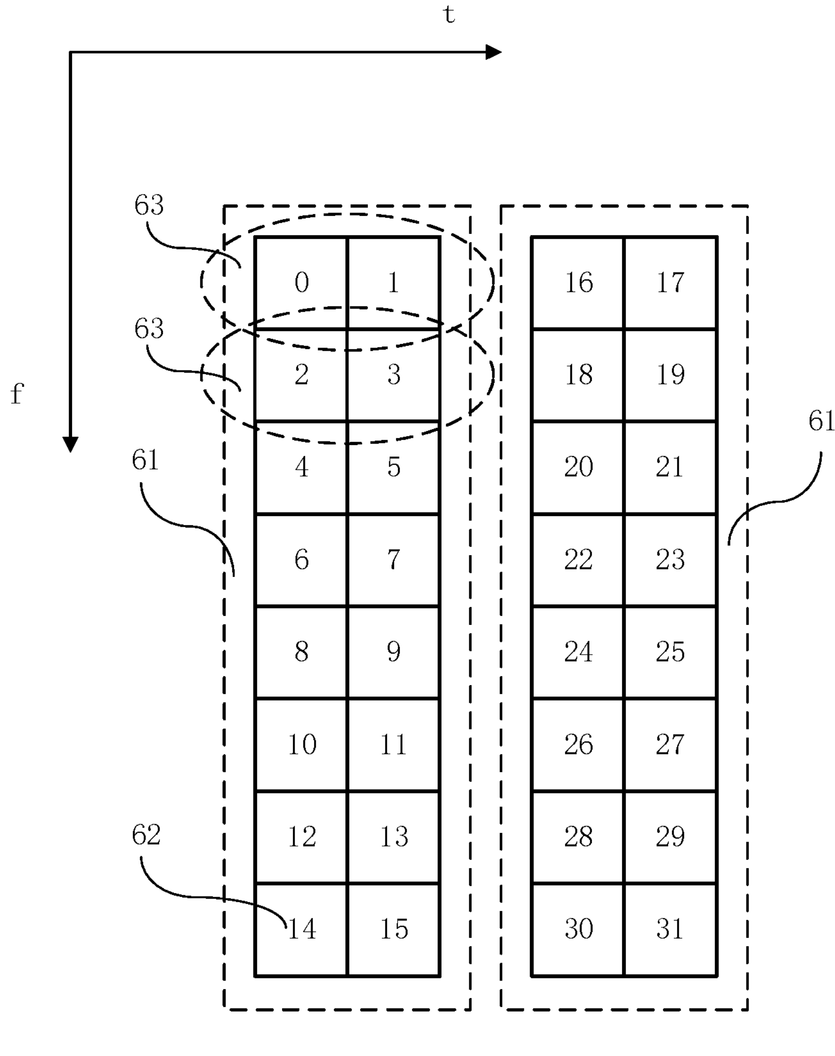
FIG. 6 is a schematic diagram of dividing CORESET into CORESET subunits related to the example shown in FIG. 4.

For example, referring to FIG. 6, it shows a schematic diagram of dividing CORESET into CORESET subunits related to some examples of the disclosure. As shown in FIG. 6, as given in the CORESET configuration parameter, when the number of OFDM symbols occupied by the CORESET subunit in the time domain is configured as two OFDM symbols, and the number of PRBs occupied in the frequency domain is configured as 8, then the CORESET is divided into two CORESET subunits 61. When the configured number of CORESET subunits in the CORESET configuration parameter is configured as 2, it may also be determined to divide the CORESET into two CORESET subunits 61.

In step 404, the base station obtains the time domain sequence of the at least two CORESET subunits.

In some examples of the disclosure, the base station numbers the at least two CORESET subunits obtained by division according to the time domain direction.

In some examples, the numbering of the CORESET subunits is performed according to the order of the time domain direction.

For example, as shown in FIG. 6, the CORESET is divided into two CORESET subunits 61, where the CORESET subunit 61 on the left may be numbered as CORESET subunit 1, and the CORESET subunit 61 on the right may be numbered as CORESET subunit 2.

In step 405, following the time domain sequence of the at least two CORESET subunits, the base station respectively numbers the REGs in the at least two CORESET subunits according to the order of first the time domain and then the frequency domain.

In some examples of the disclosure, the base station first distinguishes the CORESET subunits in order according to the sequence number of the CORESET subunits, and then respectively number the REGs included in each CORESET subunit according to the order of sequence number thereof.

In some examples, the REG numbers in different CORESET subunits is incremented in the time domain direction, that is, as the CORESET subunit number increases, the REG numbers in the corresponding CORESET subunit may be incremental.

For example, as shown in FIG. 6, the REGs 62 in the CORESET may be numbered by firstly numbering the REGs 62 in CORESET subunit 1. According to the numbering order of first the time domain and then the frequency domain, numbers from 0 to 15 are obtained in CORESET subunit 1. Then, the base station numbers the REGs 62 in CORESET subunit 2 following the REGs 62 in CORESET subunit 1, and the number of each REG 62 in CORESET subunit 2 is obtained from 16 to 31.

In step 406, the base station combines the REGs into respective REG packets according to the REG mapping rule.

In some examples of the disclosure, the base station divides the REGs included in each CORESET subunit into respective REG packets according to the REG mapping rule corresponding to the first numbering rule.

In some examples, the base station combines the REGs corresponding to the number of OFDM symbols occupied by each CORESET subunit in the time domain into each REG packet, or the base station combines 6 consecutive REGs in each CORESET subunit into each REG packet.

In some examples, several REGs may form an REG bundle, and the REG bundle may also be referred to as an REG packet.

In some examples, the REG packet may also be identified by number, for example, identified as REG bundle1, REG bundle 2, and so on.

In some examples, if an REG packet identified as REG bundle 1 contains a total of x REGs, the sequence number of each REG in the REG bundle 1 may be expressed as {i*x, i*x+1, . . . , i*x+x−1}.

For example, as shown in FIG. 6, the REG packet 63 contains a total of 2 REGs, the sequence number of each REG in REG bundle 0 may be expressed as {0, 1}, and the sequence number of each REG in REG bundle 1 may be expressed as {2, 3}. In this way, the REG packet can be divided according to the sequence numbers.

In step 407, the base station notifies the terminal of at least one of the numbering rule and the REG mapping rule.

In some examples of the disclosure, the base station determines at least one of the numbering rule and the REG mapping rule according to the mapping manner as initially obtained, and sends the determined rule information to the corresponding terminal.

In some examples, the terminal obtains the manner adopted for resource mapping through the notification.

In step 408, the terminal obtains at least one of the REG mapping rule and the numbering rule of the CORESET used by the base station to send the PDCCH.

In some examples, the terminal obtains and determines the mapping manner for performing resource mapping on the PDCCH by the base station according to the notification sent by the base station, and then the terminal obtains at least one of the REG mapping rule and the numbering rule corresponding to the mapping manner.

In some examples, the terminal receives at least one of the REG mapping rule and the numbering rule notified by the base station.

In step 409, the base station determines a mapping relationship between CCEs in the PDCCH and each REG packet according to the number of REGs in each REG packet.

In some examples, several REG packets constitute a CCE, and the CCEs may be numbered and identified as CCE j, for example, identified as CCE 1, CCE 2, and so on, where j is an integer greater than or equal to 0.

In some examples, the base station determines the mapping relationship between the CCEs and each REG packet according to a definition of the interleaver function.

In some examples, the definition of the interleaver function includes a calculation function corresponding to the centralized mapping and a calculation function corresponding to the distributed mapping. The interleaver function may be identified by f(•), and the definition of f(•) in the two mapping manners may be shown in Table 1.

TABLE 1

| Centralized Mapping | Distributed Mapping |
|---|---|
| F(x) = x | $f(x) = (rC + c + n_{shift}) \bmod \left(\frac{N_{REG}^{CORESET}}{B}\right)$<br>x = cR + r<br>r = 0, 1, . . . , R − 1<br>c = 0, 1, . . . , C − 1<br>$C = \frac{N_{REG}^{CORESET}}{BR}$ |

Herein, R is the number of rows in the interleaver, $n_{shift}$ is the offset parameter, $N_{REG}^{CORESET}$ is the total number of REGs in CORESET, and C is an integer.

In some examples, the parameters R and $n_{shift}$ are configured by the upper layer, and the upper layer configuration parameter may be used to ensure that C is an integer.

In some examples, CCE may be formed by 6 REGs.

In some examples, the corresponding relationship between the CCEs and the REG bundle index may be identified by the interleaver function f(•). Based on the identifier f(•) of a correspondingly defined interleaver function, the REG bundle corresponding to CCE j may be determined as {f(6j/x), f(6j/x+1), f(6j/x+6/x−1)}.

In step 410, the base station performs resource mapping on the PDCCH according to the mapping relationship, and determines the CCE formed by the REG packets.

In some examples of the disclosure, the base station performs resource mapping on the PDCCH according to the correspondence between the CCE and the REG bundle index, and determines the CCE formed by the REG packet.

In step 411, the base station transmits the PDCCH formed by at least one CCE to the terminal.

In step 412, the terminal receives the PDCCH sent by the base station according to at least one of the REG mapping rule and the numbering rule.

In view of above, during the transmission of PDCCH, the base station determines the CORESET configured for the terminal, numbers each of REGs in the CORESET according to the numbering rule corresponding to the CORESET, then divides the REGs into REG packets according to the REG mapping rule corresponding to the CORESET, and obtains the CCE by performing resource mapping on the PDCCH corresponding to the terminal. On the other hand, the terminal receives the REG mapping rule used by the base station for transmission. Finally, the base station transmits the PDCCH to the terminal, and the terminal can receive the PDCCH sent by the base station according to the REG mapping rule. Herein, since the resource mapping is performed based on the REG mapping rule, the capacity of CORESET can be expanded, and a higher degree of CCE aggregation can be obtained, thereby improving the efficiency of resource mapping.

Figure 7:
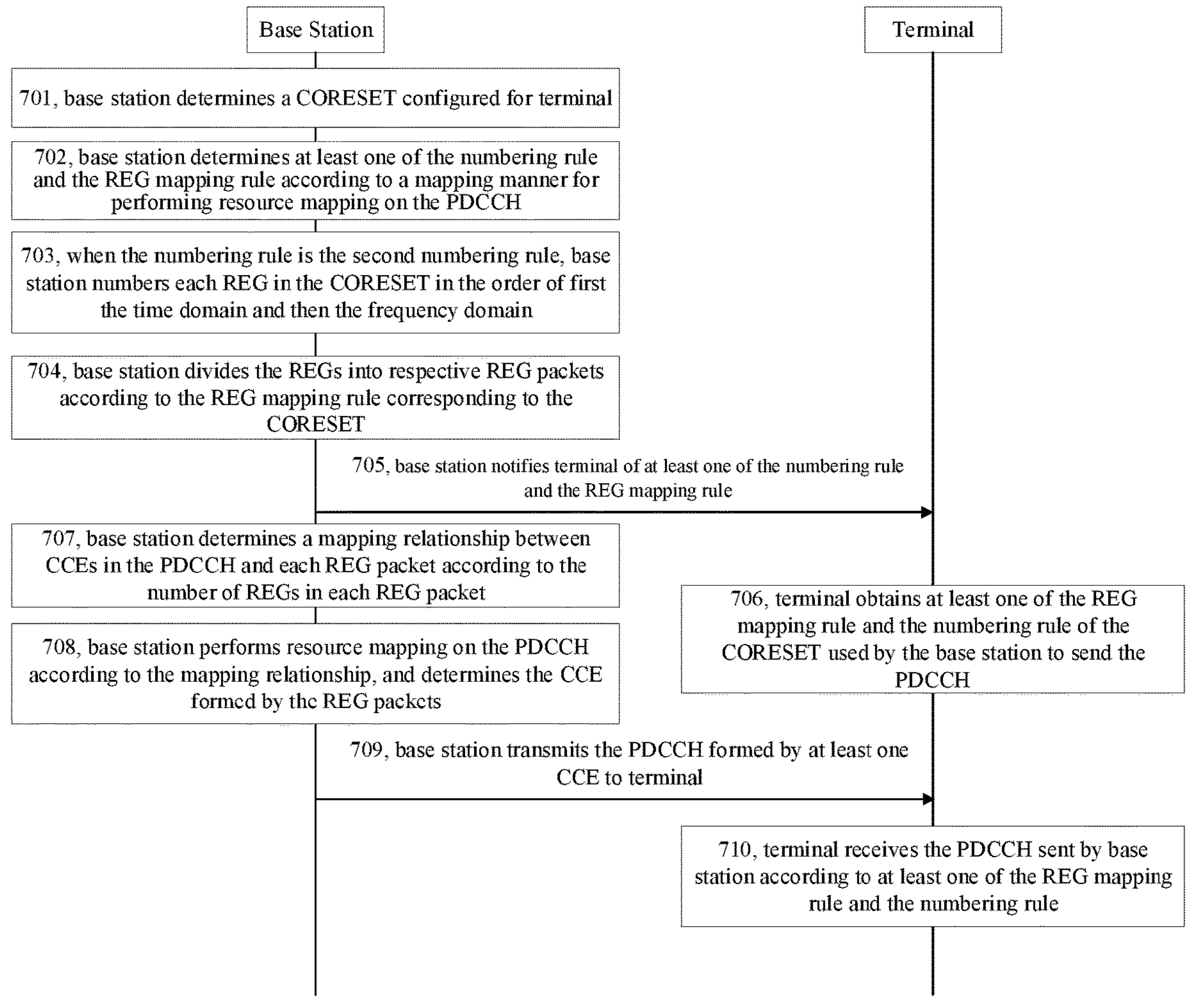
FIG. 7 is a flowchart of a PDCCH transmission method according to some other examples of the disclosure.

Referring to FIG. 7, it shows a flowchart of a PDCCH transmission method according to some other examples of the disclosure. The PDCCH transmission method may be applied to the PDCCH transmission system shown in FIG. 1 and performed based on an interaction between the terminal and the base station in FIG. 1. The method may include the following steps.

In step 701, the base station determines the CORESET configured for the terminal.

In step 702, the base station determines at least one of the numbering rule and the REG mapping rule according to the mapping manner for performing resource mapping on the PDCCH.

In step 703, when the numbering rule is the second numbering rule, the base station numbers each REG in the CORESET in the order of first the time domain and then the frequency domain.

In some examples of the disclosure, when the base station determines that the numbering rule is the second numbering rule according to the mapping manner for performing resource mapping on the PDCCH, the base station directly numbers each REG in the CORESET in the order of first the time domain and then the frequency domain.

Figure 8:
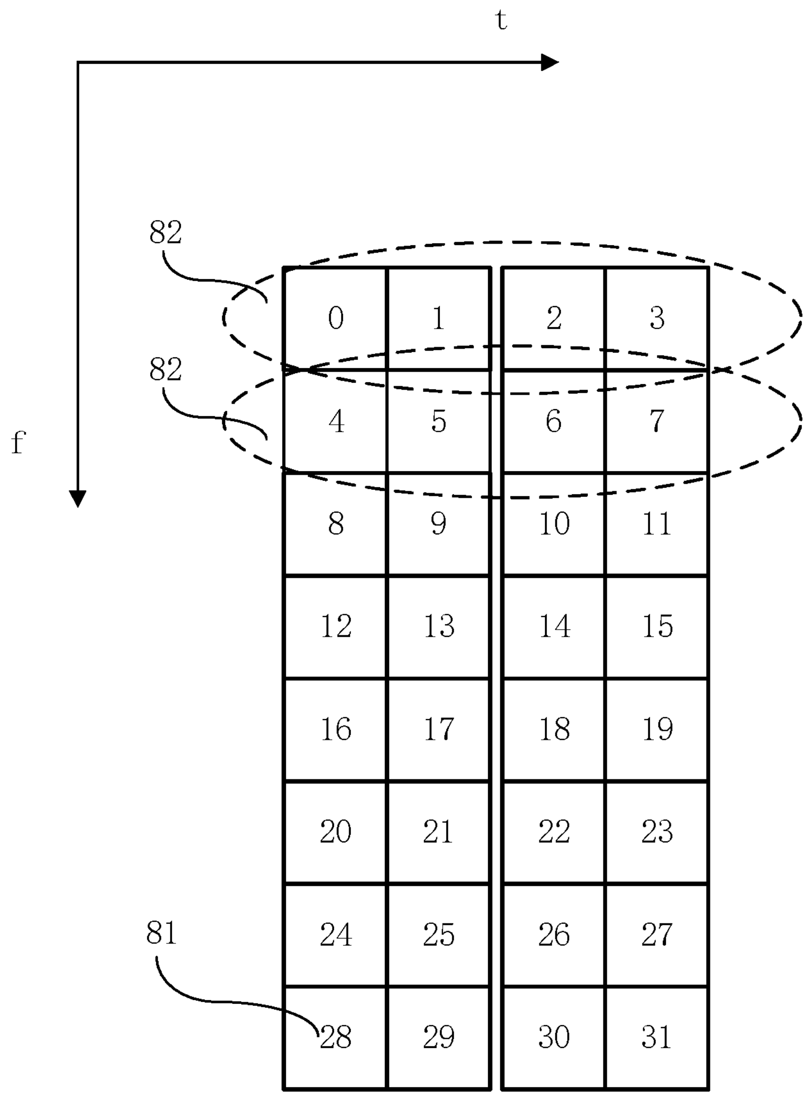
FIG. 8 is a schematic diagram of directly numbering each REG in CORESET related to the example shown in FIG. 7.

For example, referring to FIG. 8, it shows a schematic diagram of directly numbering each REG in CORESET related to some examples of the disclosure. As shown in FIG. 8, when the numbering rule is determined to be the second numbering rule, the first row of REGs 81 are firstly numbered as 0 to 3 sequentially in the time domain direction by numbering in the order of first the time domain. Then the second row of REGs 81 in the frequency domain direction are also numbered in the time domain direction. In this way, each REG 81 in the CORESET numbered from 0 to 31 can be obtained.

In step 704, the base station divides the REGs into respective REG packets according to the REG mapping rule corresponding to the CORESET.

In some examples, the base station combines the REGs corresponding to the number of OFDM symbols occupied by the CORESET in the time domain into respective REG packets, or the base station combines every 6 consecutive REGs in the CORESET into respective REG packets.

For example, as shown in FIG. 8, the REG packet 82 contains a total of 4 REGs, the sequence number of each REG in REG bundle 0 may be expressed as {0, 1, 2, 3}, and the sequence number of each REG in REG bundle 1 may be expressed as {4, 5, 6, 7}. In this way, the REG packet 82 can be divided according to the sequence numbers.

In step 705, the base station notifies the terminal of at least one of the numbering rule and the REG mapping rule.

In step 706, the terminal obtains at least one of the REG mapping rule and the numbering rule of the CORESET used by the base station to send the PDCCH.

In step 707, the base station determines the mapping relationship between the CCE in the PDCCH and each REG packet according to the number of REGs in each REG packet.

In some examples, the base station determines the mapping relationship between the CCEs and each REG packet according to a definition of the interleaver function.

In some examples, the definition of the interleaver function includes a calculation function corresponding to the centralized mapping and a calculation function corresponding to the distributed mapping. The interleaver function may be identified by f(•), and the definition of f(•) in the two mapping manners may be shown in Table 1.

In Table 1, R is the number of rows in the interleaver, $n_{shift}$ is the offset parameter, $$N_{REG}^{CORESET}$$

is the total number of REGs in CORESET, and C is an integer.

In some examples, the parameters R and $n_{shift}$ are configured by the upper layer, and the upper layer configuration parameter may be used to ensure that C is an integer.

In step 708, the base station performs resource mapping on the PDCCH according to the mapping relationship, and determines the CCE formed by the REG packet.

In some examples of the disclosure, the base station determines the CCE formed by the REG packet according to the mapping relationship between the CCE and each REG packet.

In some examples, several REG packets constitute a CCE, and the CCEs may be numbered and identified as CCE j, for example, identified as CCE 1, CCE 2, and so on, where j is an integer greater than or equal to 0.

In some examples, the corresponding relationship between the CCEs and the REG bundle index may be identified by the interleaver function f(•). Based on the identifier f(•) of a correspondingly defined interleaver function, the REG bundle corresponding to CCE j may be determined as {f(6j/x), f(6j/x+1), f(6j/x+6/x−1)}.

For example, if an REG packet identified as REG bundle 1 contains a total of 4 REGs, the REG packets corresponding to CCE 1 may include {f(3/2), f(3/2+1), f(3/2+2)}.

In step 709, the base station transmits the PDCCH to the terminal according to the CCE.

In step 710, the terminal receives the PDCCH sent by the base station according to at least one of the REG mapping rule and the numbering rule.

In some examples, the above steps 701 to 702 correspond to steps 401 to 402, and steps 705 to 710 correspond to the contents of steps 407 to 412, which are not described in detail here.

In view of above, during the transmission of PDCCH, the base station determines the CORESET configured for the terminal, numbers each of REGs in the CORESET according to the numbering rule corresponding to the CORESET, then divides the REGs into REG packets according to the REG mapping rule corresponding to the CORESET, and obtains the CCE by performing resource mapping on the PDCCH corresponding to the terminal. On the other hand, the terminal receives the REG mapping rule used by the base station for transmission. Finally, the base station transmits the PDCCH to the terminal, and the terminal can receive the PDCCH sent by the base station according to the REG mapping rule. Herein, since the resource mapping is performed based on the REG mapping rule, the capacity of CORESET can be expanded, and a higher degree of CCE aggregation can be obtained, thereby improving the efficiency of resource mapping.

The following are device examples of the present disclosure, which can be configured to implement the method examples of the present disclosure. For details that are not disclosed in the device examples of the present disclosure, the method examples of the present disclosure can be referred to.

Figures 9, 10:
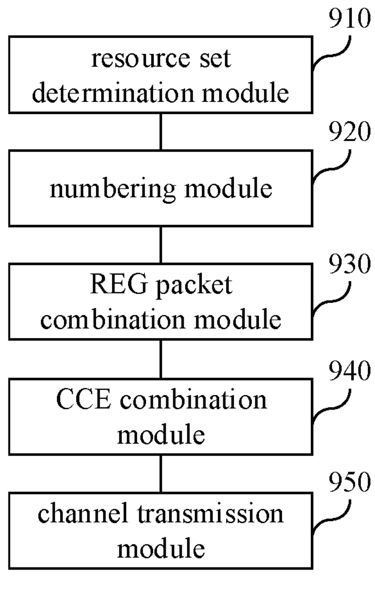
FIG. 9 is a block diagram of a PDCCH transmission apparatus according to some examples of the disclosure.
FIG. 10 is a block diagram of a PDCCH transmission apparatus according to some examples of the disclosure.

FIG. 9 is a block diagram of a PDCCH transmission apparatus according to some examples of the disclosure. As shown in FIG. 9, the PDCCH transmission apparatus may be implemented as all or part of the base station in the PDCCH transmission system shown in FIG. 1 through hardware or a combination of software and hardware, so as to perform the steps performed by the base station in any one of the examples shown in FIG. 2 or FIG. 4 or FIG. 7. The PDCCH transmission apparatus may include a resource set determination module 910, a numbering module 920, an REG packet combination module 930, a CCE combination module 940 and a channel transmission module 950.

The resource set determination module 910 is configured to determine a CORESET configured for a terminal.

The numbering module 920 is configured to number each of REGs in the CORESET according to a numbering rule, where the numbering rule is used for determining an order for numbering the each of REGs in the CORESET.

The REG packet combination module 930 is configured to combine at least one REG into an REG packet according to an REG mapping rule, where the REG mapping rule is used for determining a mapping between the REGs in the CORESET and the REG packet;

The CCE combination module 940 is configured to combine at least one REG packet into a CCE according to an REG packet mapping rule, where the REG packet mapping rule is used for determining a mapping between the REG packet and the CCE.

The channel transmission module 950 is configured to transmit a PDCCH formed by at least one CCE to the terminal.

In some examples, the apparatus further includes:

a subunit division module, configured to divide, according to a configuration parameter of the CORESET, the CORESET into at least two CORESET subunits in time domain, where the at least two CORESET subunits are time-division multiplexed.

In some examples, the numbering module 920 includes:

a numbering submodule, configured to number the REGs in the CORESET subunits sequentially according to a time-domain order of the at least two CORESET subunits.

In some examples, the numbering submodule is configured to:

number, according to a first numbering rule, the REGs in a CORESET subunit sequentially in an order of first time domain and then frequency domain, where a starting number of the REGs in the CORESET subunit is determined based on an ending number in a previous CORESET subunit.

In some examples, the CORESET subunit is determined according to a configuration parameter of a high-layer signaling, and the configuration parameter includes at least one of:

a number of OFDM symbols occupied by the CORESET subunit in time domain, a number of PRBs occupied by the CORESET subunit in frequency domain, and a configured number of the CORESET subunit.

In some examples, the CORESET subunit is determined according to a preset rule, where the preset rule includes at least one of: a number of preset subunits, OFDM symbols occupied by a preset subunit, and a relationship between PRBs occupied by the preset subunit and PRBs occupied by the CORESET.

In some examples, the REG packet combination module 930 includes:

a first unit packeting submodule, configured to combine the REGs corresponding to a number of OFDM symbols occupied by each CORESET subunit in time domain into each REG packet; or, a first fixed packeting submodule, configured to combine 6 consecutive REGs in each CORESET subunit into each REG packet.

In some examples, the numbering module 920 includes:

a second numbering submodule, configured to number, when the numbering rule is a second numbering rule, the each of REGs in the CORESET in an order of first time domain and then frequency domain.

In some examples, the REG packet combination module 930 includes:

a second packeting submodule, configured to combine the REGs corresponding to a number of OFDM symbols occupied by the CORESET in time domain into each REG packet;

or, a second fixed packeting submodule, configured to combine 6 consecutive REGs in the CORESET into each REG packet.

In some examples, the CCE combination module 940 includes:

a mapping determination submodule, configured to determine a mapping relationship between the CCE in the PDCCH and each REG packet according to a number of the REGs in each REG packet; and a CCE determination submodule, configured to determine the CCE formed by the REG packet by performing resource mapping on the PDCCH according to the mapping relationship.

In some examples, the apparatus further includes:

a rule notification module, configured to notify the terminal of at least one of the numbering rule, and the REG mapping rule.

In some examples, the apparatus further includes:

a rule determination module, configured to determine at least one of the numbering rule and the REG mapping rule according to a mapping manner for performing resource mapping on the PDCCH.

In some examples, the CORESET occupies N OFDM symbols in time domain and M PRBs in frequency domain, where N is a positive integer greater than 3, and M is a positive integer greater than 1.

In view of above, during the transmission of PDCCH, the base station determines the CORESET configured for the terminal, numbers each of REGs in the CORESET according to the numbering rule corresponding to the CORESET, then divides the REGs into REG packets according to the REG mapping rule corresponding to the CORESET, and obtains the CCE by performing resource mapping on the PDCCH corresponding to the terminal. On the other hand, the terminal receives the REG mapping rule used by the base station for transmission. Finally, the base station transmits the PDCCH to the terminal, and the terminal can receive the PDCCH sent by the base station according to the REG mapping rule. Herein, since the resource mapping is performed based on the REG mapping rule, the capacity of CORESET can be expanded, and a higher degree of CCE aggregation can be obtained, thereby improving the efficiency of resource mapping.

FIG. 10 is a block diagram of a PDCCH transmission apparatus according to some examples of the disclosure. As shown in FIG. 10, the PDCCH transmission apparatus may be implemented as all or part of the terminal in the PDCCH transmission system shown in FIG. 1 through hardware or a combination of software and hardware, so as to perform the steps performed by the terminal in any one of the examples shown in FIG. 3 or FIG. 4 or FIG. 7. The PDCCH transmission apparatus may include a rule acquiring module 1010 and a channel receiving module 1020.

The rule acquiring module 1010 is configured to acquire at least one of an REG mapping rule and a numbering rule of a CORESET used by a base station to send a PDCCH; and The channel receiving module 1020 is configured to receive the PDCCH sent by the base station according to the at least one of the REG mapping rule and the numbering rule.

In some examples, the rule acquiring module 1010 includes:

a rule receiving submodule, configured to receive the at least one of the REG mapping rule and the numbering rule notified by the base station.

In some examples, the rule acquiring module 1010 includes:

a mapping acquisition submodule, configured to determine a mapping manner for the base station to perform resource mapping on the PDCCH; and a rule acquisition submodule, configured to acquire the at least one of the REG mapping rule and the numbering rule corresponding to the mapping manner.

In some examples, the CORESET occupies N OFDM symbols in time domain and M PRBs in frequency domain, where N is a positive integer greater than 3, and M is a positive integer greater than 1.

In view of above, during the transmission of PDCCH, the base station determines the CORESET configured for the terminal, numbers each of REGs in the CORESET according to the numbering rule corresponding to the CORESET, then divides the REGs into REG packets according to the REG mapping rule corresponding to the CORESET, and obtains the CCE by performing resource mapping on the PDCCH corresponding to the terminal. On the other hand, the terminal receives the REG mapping rule used by the base station for transmission. Finally, the base station transmits the PDCCH to the terminal, and the terminal can receive the PDCCH sent by the base station according to the REG mapping rule. Herein, since the resource mapping is performed based on the REG mapping rule, the capacity of CORESET can be expanded, and a higher degree of CCE aggregation can be obtained, thereby improving the efficiency of resource mapping.

It should be noted that, when the apparatus provided in the above examples realizes its functions, the division of the above-mentioned functional modules is only used as an example for illustration. In actual applications, the above-mentioned functions can be allocated by different functional modules according to actual needs. That is, the content structure of the apparatus may be divided into different functional modules to complete all or part of the functions described above.

Regarding the apparatus in the foregoing examples, the specific manner in which each module performs operation has been described in detail in the examples of the method, and detailed description will not be given here.

Some examples of the present disclosure provide a PDCCH transmission device, which can implement all or part of the steps performed by the base station in the examples shown in FIG. 2 or FIG. 4 or FIG. 7. The PDCCH transmission device includes: a processor and a memory for storing executable instructions of the processor.

In some examples, the processor is configured to:

determine a CORESET configured for a terminal;

number each of REGs in the CORESET according to a numbering rule, where the numbering rule is used for determining an order for numbering the each of REGs in the CORESET;

combine at least one REG into an REG packet according to an REG mapping rule, where the REG mapping rule is used for determining a mapping between the REGs in the CORESET and the REG packet;

combine at least one REG packet into a CCE according to an REG packet mapping rule, where the REG packet mapping rule is used for determining a mapping between the REG packet and the CCE; and transmit a PDCCH formed by at least one CCE to the terminal.

In some examples, before numbering each REG in the CORESET according to the numbering rule, the processor is further configured to:

divide, according to a configuration parameter of the CORESET, the CORESET into at least two CORESET subunits in time domain, where the at least two CORESET subunits are time-division multiplexed.

In some examples, numbering each REG in the CORESET according to the numbering rule includes:

numbering the REGs in the CORESET subunits sequentially according to a time-domain order of the at least two CORESET subunits.

In some examples, numbering the REG in the CORESET subunits sequentially according to the time-domain sequence of the at least two CORESET subunits includes:

numbering, according to a first numbering rule, the REGs in a CORESET subunit sequentially in an order of first time domain and then frequency domain, where a starting number of the REGs in the CORESET subunit is determined based on an ending number in a previous CORESET subunit.

In some examples, the CORESET subunit is determined according to a configuration parameter of a high-layer signaling, and the configuration parameter includes at least one of:

a number of OFDM symbols occupied by the CORESET subunit in time domain, a number of PRBs occupied by the CORESET subunit in frequency domain, and a configured number of the CORESET subunit.

In some examples, the CORESET subunit is determined according to a preset rule, where the preset rule includes at least one of: a number of preset subunits, OFDM symbols occupied by a preset subunit, and a relationship between PRBs occupied by the preset subunit and PRBs occupied by the CORESET.

In some examples, combining the at least one REG into the REG packet according to the REG mapping rule includes:

combining the REGs corresponding to a number of OFDM symbols occupied by each CORESET subunit in time domain into each REG packet;

or, combining 6 consecutive REGs in each CORESET subunit into each REG packet.

In some examples, numbering each of REGs in the CORESET according to the numbering rule includes:

numbering, when the numbering rule is a second numbering rule, the each of REGs in the CORESET in an order of first time domain and then frequency domain.

In some examples, combining the at least one REG into the REG packet according to the REG mapping rule includes:

combining the REGs corresponding to a number of OFDM symbols occupied by the CORESET in time domain into each REG packet;

or, combining 6 consecutive REGs in the CORESET into each REG packet.

In some examples, combining the at least one REG packet into the CCE according to the REG packet mapping rule includes:

determining a mapping relationship between the CCE in the PDCCH and each REG packet according to a number of the REGs in each REG packet; and determining the CCE formed by the REG packet by performing resource mapping on the PDCCH according to the mapping relationship.

In some examples, the processor is further configured to:

notify the terminal of at least one of the numbering rule, the REG mapping rule, and the REG mapping rule.

In some examples, the processor is further configured to:

determine at least one of the numbering rule, the REG mapping rule, and the REG mapping rule according to a mapping manner for performing resource mapping on the PDCCH.

In some examples, the CORESET occupies N OFDM symbols in time domain and M PRBs in frequency domain, where N is a positive integer greater than 3, and M is a positive integer greater than 1.

In view of above, during the transmission of PDCCH, the base station determines the CORESET configured for the terminal, numbers each of REGs in the CORESET according to the numbering rule corresponding to the CORESET, then divides the REGs into REG packets according to the REG mapping rule corresponding to the CORESET, and obtains the CCE by performing resource mapping on the PDCCH corresponding to the terminal. On the other hand, the terminal receives the REG mapping rule used by the base station for transmission. Finally, the base station transmits the PDCCH to the terminal, and the terminal can receive the PDCCH sent by the base station according to the REG mapping rule. Herein, since the resource mapping is performed based on the REG mapping rule, the capacity of CORESET can be expanded, and a higher degree of CCE aggregation can be obtained, thereby improving the efficiency of resource mapping.

Some examples of the present disclosure provide a PDCCH transmission device, which can implement all or part of the steps performed by the terminal in the examples shown in FIG. 3 or FIG. 4 or FIG. 7. The PDCCH transmission device includes: a processor and a memory for storing executable instructions of the processor.

In some examples, the processor is configured to:

acquire at least one of an REG mapping rule and a numbering rule of a CORESET used by a base station to send a PDCCH; and receive the PDCCH sent by the base station according to the at least one of the REG mapping rule and the numbering rule.

In some examples, acquiring at least one of the REG mapping rule and the numbering rule of the CORESET used by the base station to send the PDCCH includes:

receiving the at least one of the REG mapping rule and the numbering rule notified by the base station.

In some examples, acquiring at least one of the REG mapping rule and the numbering rule of the CORESET used by the base station to send the PDCCH includes:

determining a mapping manner for the base station to perform resource mapping on the PDCCH; and acquiring the at least one of the REG mapping rule REG mapping rule and the numbering rule corresponding to the mapping manner.

In some examples, the CORESET occupies N OFDM symbols in time domain and M PRBs in frequency domain, where N is a positive integer greater than 3, and M is a positive integer greater than 1.

In view of above, during the transmission of PDCCH, the base station determines the CORESET configured for the terminal, numbers each of REGs in the CORESET according to the numbering rule corresponding to the CORESET, then divides the REGs into REG packets according to the REG mapping rule corresponding to the CORESET, and obtains the CCE by performing resource mapping on the PDCCH corresponding to the terminal. On the other hand, the terminal receives the REG mapping rule used by the base station for transmission. Finally, the base station transmits the PDCCH to the terminal, and the terminal can receive the PDCCH sent by the base station according to the REG mapping rule. Herein, since the resource mapping is performed based on the REG mapping rule, the capacity of CORESET can be expanded, and a higher degree of CCE aggregation can be obtained, thereby improving the efficiency of resource mapping.

The foregoing mainly takes terminals and base stations as examples to introduce the solutions according to some examples of the present disclosure. It can be understood that, in order to implement the above-mentioned functions, the terminal includes hardware structures and/or software modules corresponding to each function. In combination with the modules and algorithm steps of the examples described in the examples disclosed in the present disclosure, the examples of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions provided by the examples of the present disclosure.

Figure 11:
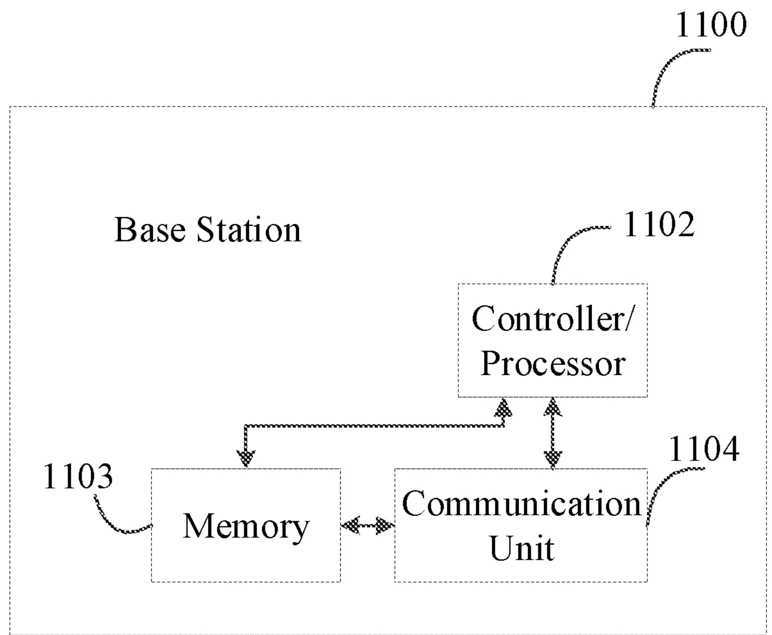
FIG. 11 is a block diagram of a base station according to some examples of the disclosure.

FIG. 11 is a block diagram of a base station according to some examples of the disclosure.

As shown in FIG. 11, the base station 1100 includes a communication unit 1104 and a processor 1102. The processor 1102 may also be a controller, which is represented as "controller/processor 1102" in FIG. 11. The communication unit 1104 is configured to support the base station to communicate with other network devices (for example, a terminal or other base stations, and the like).

Further, the base station 1100 may further include a memory 1103, and the memory 1103 is configured to store program codes and data of the base station 1100.

It should be understood that FIG. 11 only shows a simplified design of the base station 1100. In practical applications, the base station 1100 may include any number of processors, controllers, memories, communication units, and the like, and all terminals that can implement the examples of the present disclosure should fall within the protection scope of the examples of the present disclosure.

Figure 12:
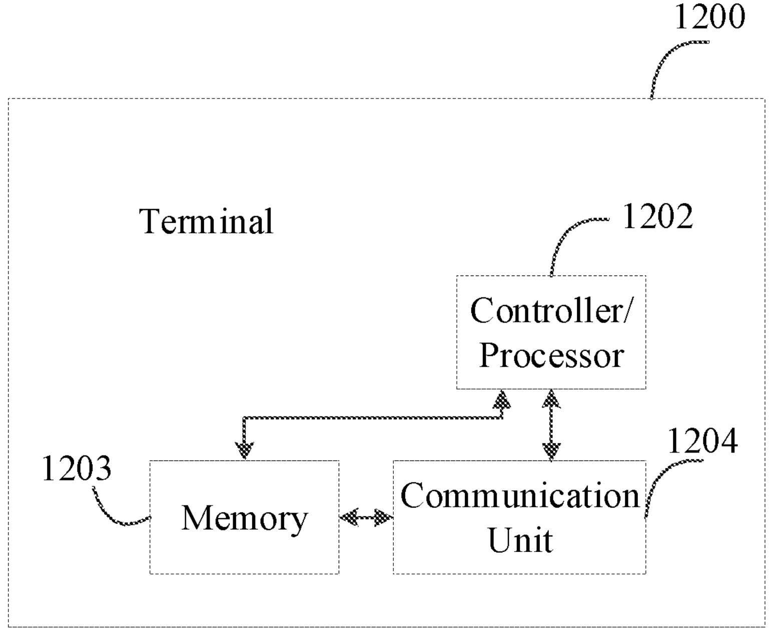
FIG. 12 is a block diagram of a terminal according to some examples of the disclosure.

FIG. 12 is a block diagram of a terminal according to some examples of the disclosure.

As shown in FIG. 12, the terminal 1200 includes a communication unit 1204 and a processor 1202. The processor 1202 may also be a controller, which is represented as "controller/processor 1202" in FIG. 12. The communication unit 1204 is configured to support the terminal to communicate with other network devices (for example, a base station and the like).

Further, the terminal 1200 may further include a memory 1203, and the memory 1203 is configured to store program codes and data of the terminal 1200.

It should be understood that FIG. 12 only shows a simplified design of the terminal 1200. In practical applications, the terminal 1200 may include any number of processors, controllers, memories, communication units, and the like, and all terminals that can implement the examples of the present disclosure should fall within the protection scope of the examples of the present disclosure.

It should be noted by those skilled in the art that, in one or more of the foregoing examples, the functions described in the examples of the present disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium, where the communication medium includes any medium that facilitates the transfer of a computer program from one place to another. The storage medium may be any available medium that can be accessed by a general-purpose or special-purpose computer.

Some examples of the present disclosure also provide a computer storage medium, and the readable storage medium contains executable instructions, which are invoked and executed by a processor in a terminal or a base station, so as to implement the above-mentioned various examples of the PDCCH transmission method executed by the terminal or the base station. Alternatively, the executable instruction is invoked and executed by the processor in the terminal or the base station to implement the PDCCH transmission method executed by the terminal or the base station in the foregoing various method examples.

Those skilled in the art will easily think of other examples of the present disclosure after considering the specification and practicing the disclosure herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the examples are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A physical downlink control channel (PDCCH) transmission method, comprising:

determining, by a base station, a control resource set (CORESET) configured for a terminal;

dividing, by the base station, the CORESET into at least two CORESET subunits according to a number of orthogonal frequency division multiplexing (OFDM) symbols occupied by the at least two CORESET subunits in time domain and a number of physical resource blocks (PRBs) occupied by the at least two CORESET subunits in frequency domain, wherein the at least two CORESET subunits are time-division multiplexed, and the at least two CORESET subunits comprise a first CORESET subunit and a second CORESET subunit, wherein the first CORESET subunit occupies a first OFDM symbol and a second OFDM symbol in time domain, the second CORESET subunit occupies a third OFDM symbol and a fourth OFDM symbol in time domain, and the first OFDM symbol, the second OFDM symbol, the third OFDM symbol and the fourth OFDM symbol are located at different positions in time domain;

numbering, by the base station, the at least two CORESET subunits according to a time domain direction;

numbering, by the base station, resource element groups (REGs) in the at least two CORESET subunits sequentially according to a number order of the at least two CORESET subunits;

combining, by the base station, at least one REG into an REG packet according to an REG mapping rule, wherein the REG mapping rule is configured for determining a mapping between the REGs in the CORESET and the REG packet;

combining, by the base station, at least one REG packet into a control channel element (CCE) according to an REG packet mapping rule, wherein the REG packet mapping rule is used for determining a mapping between the REG packet and the CCE; and transmitting, by the base station, a PDCCH formed by at least one CCE to the terminal.

2. The method according to claim 1, wherein numbering the REGs in the at least two CORESET subunits sequentially according to the number order of the at least two CORESET subunits comprises:

numbering the REGs in the at least two CORESET subunits sequentially in an order of first time domain and then frequency domain, wherein a starting number of the REGs in a CORESET subunit is determined based on an ending number in a previous CORESET subunit.

3. The method according to claim 1, wherein the at least two CORESET subunits are determined according to a configuration parameter of a high-layer signaling, and the configuration parameter comprises:

a configured number of the at least two CORESET subunits.

4. The method according to claim 3, wherein combining the at least one REG into the REG packet according to the REG mapping rule comprises:

combining the REGs corresponding to the number of OFDM symbols occupied by a CORESET subunit in time domain into the REG packet; or combining 6 consecutive REGs in a CORESET subunit into the REG packet.

5. The method according to claim 1, wherein the at least two CORESET subunits are determined according to a preset rule, wherein the preset rule comprises at least one of following parameters: a number of preset subunits, OFDM symbols occupied by a preset subunit, or a relationship between PRBs occupied by the preset subunit and PRBs occupied by the CORESET.

6. The method according to claim 1, wherein combining the at least one REG packet into the CCE according to the REG packet mapping rule comprises:

determining a mapping relationship between the CCE in the PDCCH and the REG packet according to a number of the REGs in the REG packet; and determining the CCE formed by the REG packet by performing resource mapping on the PDCCH according to the mapping relationship.

7. The method according to claim 1, further comprising: notifying the terminal of at least one of the numbering rule and the REG mapping rule.

8. The method according to claim 1, further comprising: determining at least one of the numbering rule and the REG mapping rule according to a mapping manner for performing resource mapping on the PDCCH.

9. The method according to claim 1, wherein the CORESET occupies N OFDM symbols in time domain and M PRBs in frequency domain, where Nis a positive integer greater than 3, and M is a positive integer greater than 1.

10. A physical downlink control channel (PDCCH) transmission method, comprising:

acquiring, by a terminal, at least one of an REG mapping rule and a numbering rule of a control resource set (CORESET) used by a base station to send a PDCCH, wherein the CORESET comprises at least two CORESET subunits, the at least two CORESET subunits are divided by the base station according to a number of orthogonal frequency division multiplexing (OFDM) symbols occupied by the at least two CORESET subunits in time domain and a number of physical resource blocks (PRBs) occupied by the at least two CORESET subunits in frequency domain, and wherein the at least two CORESET subunits are time-division multiplexed, and the at least two CORESET subunits comprise a first CORESET subunit and a second CORESET subunit, wherein the first CORESET subunit occupies a first OFDM symbol and a second OFDM symbol in time domain, the second CORESET subunit occupies a third OFDM symbol and a fourth OFDM symbol in time domain, and the first OFDM symbol, the second OFDM symbol, the third OFDM symbol and the fourth OFDM symbol are located at different positions in time domain; and receiving, by the terminal, the PDCCH sent by the base station according to the at least one of the REG mapping rule and the numbering rule, wherein the numbering rule is configured for the base station to number the at least two CORESET subunits according to a time domain direction and number resource element groups (REGs) in the at least two CORESET subunits sequentially according to a number order of the at least two CORESET subunits, and the REG mapping rule is configured for determining a mapping between the REGs in the CORESET.

11. The method according to claim 10, wherein acquiring at least one of the REG mapping rule and the numbering rule of the CORESET used by the base station to send the PDCCH comprises:

receiving the at least one of the REG mapping rule and the numbering rule notified by the base station.

12. The method according to claim 10, wherein acquiring at least one of the REG mapping rule and the numbering rule of the CORESET used by the base station to send the PDCCH comprises:

determining a mapping manner for the base station to perform resource mapping on the PDCCH; and acquiring the at least one of the REG mapping rule REG mapping rule and the numbering rule corresponding to the mapping manner.

13. The method according to claim 10, wherein the CORESET occupies N OFDM symbols in time domain and M PRBs in frequency domain, where N is a positive integer greater than 3, and M is a positive integer greater than 1.

14. A physical downlink control channel (PDCCH) transmission device, being applied in a base station and comprising:

a processor; and a memory for storing executable instructions of the processor;

wherein the processor is configured to:

determine a control resource set (CORESET) configured for a terminal;

divide the CORESET into at least two CORESET subunits according to a number of orthogonal frequency division multiplexing (OFDM) symbols occupied by the at least two CORESET subunits in time domain and a number of physical resource blocks (PRBs) occupied by the at least two CORESET subunits in frequency domain, wherein the at least two CORESET subunits are time-division multiplexed, and the at least two CORESET subunits comprise a first CORESET subunit and a second CORESET subunit, wherein the first CORESET subunit occupies a first OFDM symbol and a second OFDM symbol in time domain, the second CORESET subunit occupies a third OFDM symbol and a fourth OFDM symbol in time domain, and the first OFDM symbol, the second OFDM symbol, the third OFDM symbol and the fourth OFDM symbol are located at different positions in time domain;

number the at least two CORESET subunits according to a time domain direction;

number resource element groups (REGs) in the at least two CORESET subunits sequentially according to a number order of the at least two CORESET subunits;

combine at least one REG into an REG packet according to an REG mapping rule, wherein the REG mapping rule is used for determining a mapping between the REGs in the CORESET and the REG packet;

combine at least one REG packet into a control channel element (CCE) according to an REG packet mapping rule, wherein the REG packet mapping rule is used for determining a mapping between the REG packet and the CCE; and transmit a PDCCH formed by at least one CCE to the terminal.

* * * * *